April 21, 1953
A. UBERTINI
2,635,479
WORM GEAR DRIVE
Filed Oct. 9, 1950
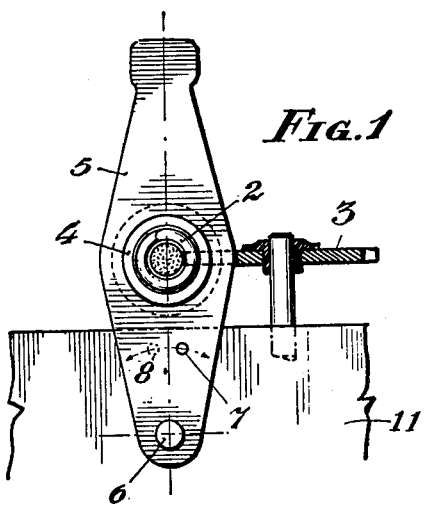
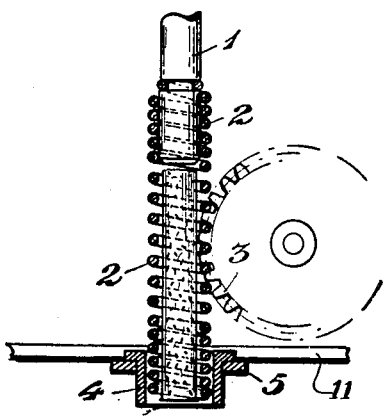
INVENTOR
ALEJANDRO UBERTINI
By Linton and Linton
ATTORNEYS Patented Apr. 21, 1953

2,635,479

UNITED STATES PATENT OFFICE 2,635,479

WORM GEAR DRIVE

Alejandro Ubertini, Buenos Aires, Argentina

Application October 9, 1950, Serial No. 189,076
In Argentina September 12, 1950

2 Claims. (Cl. 74—396)

The present invention is concerned with an improvement in worm gear drives whereby the engagement of the work and worm wheel can be made directly and in an intermittent manner.

Until now no efficient means has been provided for engaging and disengaging intermittently the driving member of a worm gear, be it worm or worm wheel, with the driven member with the meshing being made so that the threads of the work coincide exactly with the teeth of the worm wheel to prevent a locking of the gearing.

In order to avoid this difficulty, applicant has conceived of using as the helicoidal threads of the work a spring conveniently fixed to a shaft and providing enough elasticity for compensating, at the moment of meshing with the worm wheel, for any possible difference in the position between teeth and threads, in any direction, and gearing in any position when making contact with the wheel or vice versa.

The invention will now be further described making reference to the accompanying drawings, in which:

Fig. 1 is a front elevation of the transmission;
Fig. 2 is a top plan view of same.

In said drawings, 1 is the driving shaft to one end of which a spring 2 is firmly secured or welded and extends therefrom in an axial direction. The spirals of said spring are separated forming the desired helicoidal threads of a worm, by which movement is transmitted to worm wheel 3 which extends substantially at right angles to said spring. The free end of spring 2 is loosely positioned in a bushing 4 secured in an opening in arm 5 pivotal on pin 6 extending from support 11. Arm 5 carries a stop 7 positioned for contacting a similar stop 8 on support 11 whereby said pins contact one another during the pivoting of arm 5 for limiting said pivotal movement away from wheel 3.

To uncouple the worm gearing, lever 5 is gripped at the top thereof and pivoted about pin 6 removing spring 2 from engagement with wheel 3. The resiliency of spring 2 causes lever 5 to pivot back upon the release thereof whereby spring 2 again engages wheel 3 and upon the rotation of shaft 1 spring 2 will rotate therewith and in turn rotate wheel 3.

By the foregoing means a flexible and elastic coupling is obtained, the use of which improves and simplifies certain mechanisms in which this type of transmission is desirable, mainly those in which the movement must be stopped more or less frequently without stopping the driving shaft.

Having now particularly described and ascertained the nature of my said invention and in what manner the same is to perform, I declare that what I claim is:

1. An improvement in worm gear drives comprising a driving shaft, a coil spring attached to said shaft, a worm wheel extending substantially at right angles to said spring with the teeth thereof normally engaging the spirals of said spring, and a pivotally mounted lever having an opening therethrough, into which extends said spring for moving the same out of and into engagement with said wheel.

2. An improvement in worm gear drives comprising a driving shaft, a coil spring connected at one end to an end of and extending coaxially from said shaft, a worm wheel extending substantially at right angles to said spring with the teeth thereof normally engaging the spirals of said spring and a lever supported for pivotal movement laterally of said spring and having an opening formed therethrough into which extends the free end of said spring.

ALEJANDRO UBERTINI.

References Cited in the file of this patent

UNITED STATES PATENTS

| Number | Name | Date |
|---|---|---|
| 2,108,579 | Collins | Feb. 15, 1938 |